(12) United States Patent
Yang et al.

(10) Patent No.: US 11,713,119 B2
(45) Date of Patent: Aug. 1, 2023

(54) ROTORCRAFT

(71) Applicant: Coretronic Intelligent Robotics Corporation, Hsinchu County (TW)

(72) Inventors: I-Ta Yang, Hsinchu County (TW); Ying-Chieh Chen, Hsinchu County (TW); Chi-Tong Hsieh, Hsinchu County (TW); Hsu-Chih Cheng, Hsinchu County (TW)

(73) Assignee: Coretronic Intelligent Robotics Corporation, Hsinchu County (TW)

( * ) Notice: Subject to any disclaimer, the term of this patent is extended or adjusted under 35 U.S.C. 154(b) by 668 days.

(21) Appl. No.: 16/396,795

(22) Filed: Apr. 29, 2019

(65) Prior Publication Data
US 2020/0001995 A1 Jan. 2, 2020

(30) Foreign Application Priority Data
Jun. 29, 2018 (CN) .......................... 201810693552.3

(51) Int. Cl.
*B64C 27/473* (2006.01)
*B64U 10/13* (2023.01)
*B64U 30/20* (2023.01)
*B64C 39/02* (2023.01)

(52) U.S. Cl.
CPC .......... *B64C 39/024* (2013.01); *B64C 27/473* (2013.01); *B64U 10/13* (2023.01); *B64U 30/20* (2023.01)

(58) Field of Classification Search
CPC . B64C 27/473; B64C 27/52; B64C 2201/027; B64C 2201/108; B64C 2201/165; B64U 10/13; B64U 30/20
See application file for complete search history.

(56) References Cited

U.S. PATENT DOCUMENTS

| | | | |
|---|---|---|---|
| 2009/0159757 A1 | 6/2009 | Yoeli | |
| 2017/0190421 A1* | 7/2017 | Diez-Garias | A63H 23/08 |
| 2018/0002003 A1* | 1/2018 | Won | B64C 29/02 |
| 2019/0009895 A1* | 1/2019 | Tu | B64C 29/0025 |
| 2019/0263520 A1* | 8/2019 | Todokoro | B64D 27/24 |
| 2019/0291859 A1* | 9/2019 | Manning | B64C 39/026 |

FOREIGN PATENT DOCUMENTS

| | | | |
|---|---|---|---|
| CN | 104859859 A | | 8/2015 |
| CN | 105035313 A | | 11/2015 |
| CN | 105836119 A | * | 8/2016 |
| CN | 105836119 A | | 8/2016 |

(Continued)

*Primary Examiner* — Nicholas McFall
*Assistant Examiner* — Terri L Filosi

(57) ABSTRACT

A rotorcraft includes a body and a plurality of rotary-wing parts. The body has a front-end portion, a rear-end portion, two side portions, and a reference plane passing through the front-end portion, the rear-end portion, and the two side portions. The plurality of rotary-wing parts are disposed to the body. Each of the rotary-wing parts includes at least one blade and a shaft coupled to the at least one blade. The at least one blade is rotated around an axis of the shaft. An angle between the axis of the shaft and a normal line of the reference plane is between 5 and 30 degrees. The rotorcraft can provide additional lift force, to help reduce the weight of the rotorcraft.

5 Claims, 4 Drawing Sheets

(56) References Cited

FOREIGN PATENT DOCUMENTS

| | | | |
|---|---|---|---|
| CN | 106184737 | A | 12/2016 |
| CN | 107176297 | A | 9/2017 |
| CN | 107336842 | A | 11/2017 |
| GB | 456177 | A | 11/1936 |
| RU | 2627963 | C1 * | 8/2017 |
| WO | 2014108459 | A1 | 7/2014 |

* cited by examiner

20

ROTORCRAFT

CROSS-REFERENCE TO RELATED APPLICATION

This application claims the priority benefit of china application CN201810693552.3 filed on 2018 Jun. 29. The entirety of the above-mentioned patent application is hereby incorporated by reference herein and made a part of this specification.

FIELD OF THE INVENTION

The invention relates to an aircraft, and in particular to a rotorcraft.

BACKGROUND OF THE INVENTION

Drone is an existing emerging aircraft. Most of the current drones, such as a quadcopter which is commonly seen on the market, have a light weight to maintain a certain hovering time. Therefore, how to further improve the hovering time of drones is a topic that many people are interested in.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide a rotorcraft, which can provide an additional lift force to help reduce the weight of the rotorcraft.

Other objectives and advantages of the invention can be further illustrated by the technical features broadly embodied and described as follows.

The rotorcraft provided by the invention includes a body and a plurality of rotary-wing parts. The body has a front-end portion, a rear-end portion, two side portions, and a reference plane passing through the front-end portion, the rear-end portion, and the two side portions. The plurality of rotary-wing parts are disposed to the body. Each of the rotary-wing part includes at least one blade and a shaft coupled to the at least one blade. The at least one blade is rotated around an axis of the coupled shaft. An angle between the axis of the shaft and a normal line of the reference plane is between 5 and 30 degrees.

Based on the above, since the angle between an axis of each of the shafts and the normal line of the reference plane is between 5 and 30 degrees, a positive angle of attack (AOA) can be formed when the rotorcraft of the invention moves forward, so that the bottom surface of the body can become a frontal surface for the air stream, thereby generating additional lift force to reduce the load of the rotorcraft.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
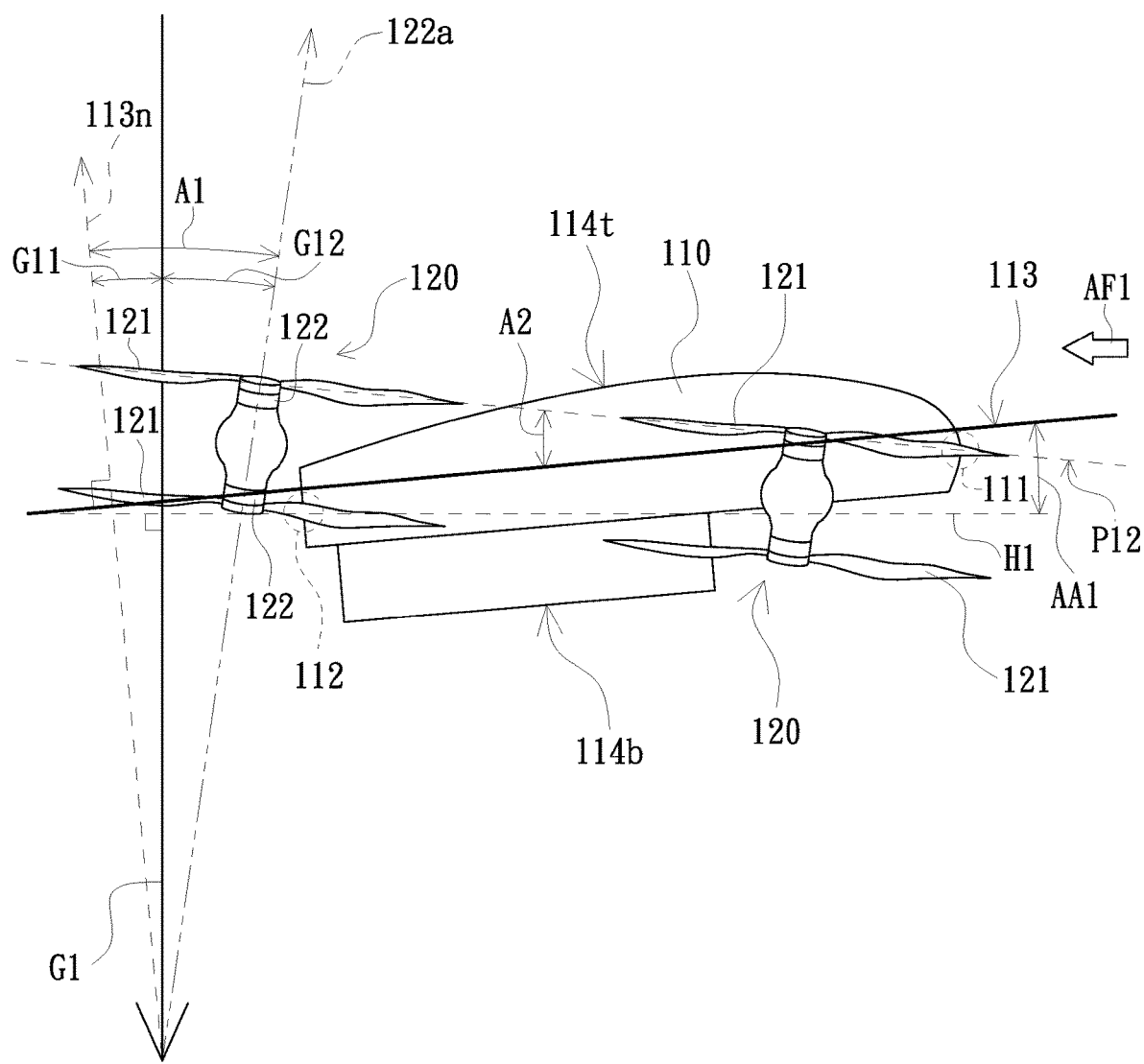
FIG. 1A is a side view of a rotorcraft in accordance with an embodiment of the invention.

FIG. 1A is a side view of a rotorcraft in accordance with an embodiment of the invention. Referring to FIG. 1A, the rotorcraft 100 includes a body 110 and a plurality of rotary-wing parts 120. The rotary-wing parts 120 are disposed to the body 110 and may surround the body 110. Each of the rotary-wing parts 120 includes at least one blade 121 and a shaft 122. The shaft 122 is coupled (axially coupled) to the blade 121 of the same rotary-wing part 120, wherein the blade 121 is rotated around the axis 122a of the coupled shaft 122. In the embodiment, the center of the blade 121 has an opening for fixing and connecting the shaft 122. When the blades 121 of the rotary-wing parts 120 rotate, the blades 121 can generate lift force to drive the rotorcraft 100 to fly off the ground. In the embodiment of FIG. 1A, the rotorcraft 100 may be a quadcopter and include four rotary-wing parts 120, wherein each of the rotary-wing parts 120 includes two blades 121. Specifically, two blades 121 are disposed to the same rotary-wing part 120, and the two blades 121 are coupled to the two ends of the shaft 122 respectively, as shown in FIG. 1A. However, in other embodiments, the number of the blades 121 included in the at least one rotary-wing part 120 may be only one, and the invention is not limited thereto. Moreover, in other embodiments, the rotary-wing parts 120 have at least two rotary-wing parts 120.

Referring to FIG. 1A, in the embodiment, the body 110 has a front-end portion 111, a rear-end portion 112, a top surface 114t, a bottom surface 114b, and two side portions. The two side portions include a left-end portion (not shown) and a right-end portion (not labeled). The front-end portion 111 and the rear-end portion 112 are opposite to each other, and the top surface 114t and the bottom surface 114b are opposite to each other. One of the two side portions is opposite to another. The top surface 114t and the bottom surface 114b are extended between the front-end portion 111 and the rear-end portion 112. The body 110 further has a reference plane 113 which is defined as a plane passing through the front-end portion 111, the rear-end portion 112 and the two side portions. The reference plane 113 is located between the top surface 114t and the bottom surface 114b. The reference plane 113 is a virtual plane and passes through the foremost end, the rearmost end of the body 110 and the two side portions. The foremost end may be a leading edge of the front-end portion 111, and the rearmost end may be a trailing edge of the rear-end portion 112. The maximum length of the body 110 is substantially equal to the distance between the foremost end and the rearmost end. A central axis (not shown) of the body 110 also passes through the foremost end and the rearmost end, and the side portions are symmetrically disposed with respect to the central axis of the body 110. The central axis of the body 110 is coplanar with the reference plane 113. The reference plane 113 also passes through the left-end portion (not shown) and the right-end portion (not labeled) of the body 110, and the right-end portion and the left-end portion are symmetrical with each other with the central axis of the body 110 as an axis of symmetry. Further, the shaft 122 of each of the rotary-wing parts 120 is inclined toward the front-end portion 111. As shown in FIG. 1A, the upper end of the shaft 122 is closer to the front-end portion 111 than the lower end of the same shaft 122.

In the embodiment, the angle G11 between the direction of the normal line 113n of the reference plane 113 of the rotorcraft 100 and the gravity line G1 may be about 5 to 20 degrees, and the angle G12 between the axis 122a of the shaft 122 and the gravity line G1 may be about 0 to 10 degrees. In other embodiments, the axis 122a may be parallel to the gravity line G1. Therefore, the axis 122a of the shafts 122 is not parallel to the normal line 113n of the reference plane 113 and may be extended to intersect with the normal line 113n. Taking FIG. 1A as an example, the angle A1 between the axis 122a of each of the shafts 122 and the normal line 113n is equal to the sum of the angle G11 and the angle G12, so the angle A1 is about 5 to 30 degrees.

At least one of the blades 121 of the rotary-wing parts 120 may be located on a coplanar plane P12, wherein the axis 122a is perpendicular to the coplanar plane P12. Taking FIG. 1A as an example, the blades 121 adjacent to the top surface 114t of the body 110 (i.e., the blades 121 located above in FIG. 1A) are located on a coplanar plane P12, and the other blades 121 adjacent to the bottom surface 114b of the body 110 (i.e., the blades 121 located below in FIG. 1A) are located on another coplanar plane P12. That is, the blades 121 connected to the same end of the shaft 122 are located on one coplanar plane P12, and the blades 121 connected to the other end of the shaft 122 are located on another coplanar plane P12. The two coplanar planes P12 are parallel to each other, and the blades 121 located on the same coplanar planes P12 are adjacent to the front-end portion 111 and the rear-end portion 112, respectively. Moreover, these coplanar planes P12 are virtual planes and are not parallel to the reference plane 113. For example, the angle A2 between the coplanar plane P12 and the reference plane 113 may be between 5 and 20 degrees.

Figure 1B:
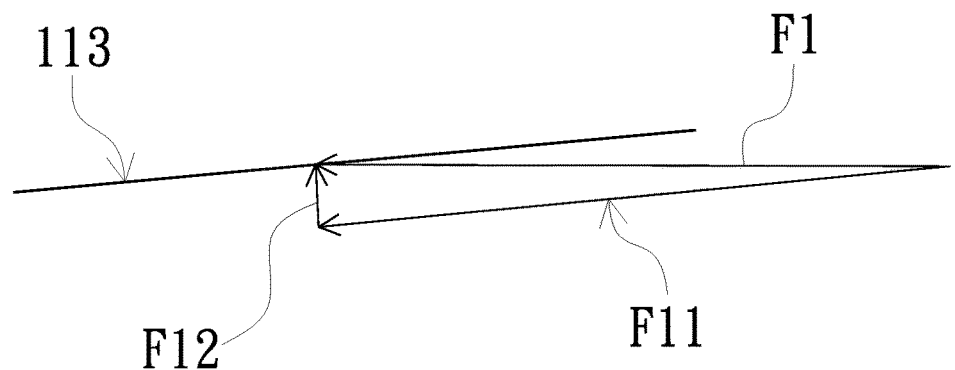
FIG. 1B is a schematic force diagram illustrating the force generated by applying an air stream to the rotorcraft of FIG. 1A.

FIG. 1B is a schematic force diagram illustrating the force generated by applying an air stream to the rotorcraft of FIG. 1A. Referring to FIGS. 1A and 1B, since the angle A1 between the axis 122a and the normal line 113n of the reference plane 113 is about 5 to 30 degrees and each of the shafts 122 is inclined toward the front-end portion 111, an angle of attack AA1 between 5 and 20 degrees may be formed when the rotorcraft 100 is flying forward and the angle of attack AA1 is positive. In the embodiment shown in FIG. 1A, the angle of attack AA1 is substantially equal to the angle between the reference plane 113 and the horizontal plane H1. Thus, the air stream AF1 flowing along the horizontal plane H1 is blown toward the bottom surface 114b of the body 110, and may generate an external force F1 to the bottom surface 114b. The external force F1 may be divided into two component forces F11 and F12 respectively along the direction parallel to and the direction perpendicular to the reference planes 113. The direction of the component force F12 is a direction perpendicular to the reference plane 113 and the component force F12 is a lift force for the body 110. The normal line of the horizontal plane H1 is perpendicular to the direction of the air stream AF1.

Figure 1C:
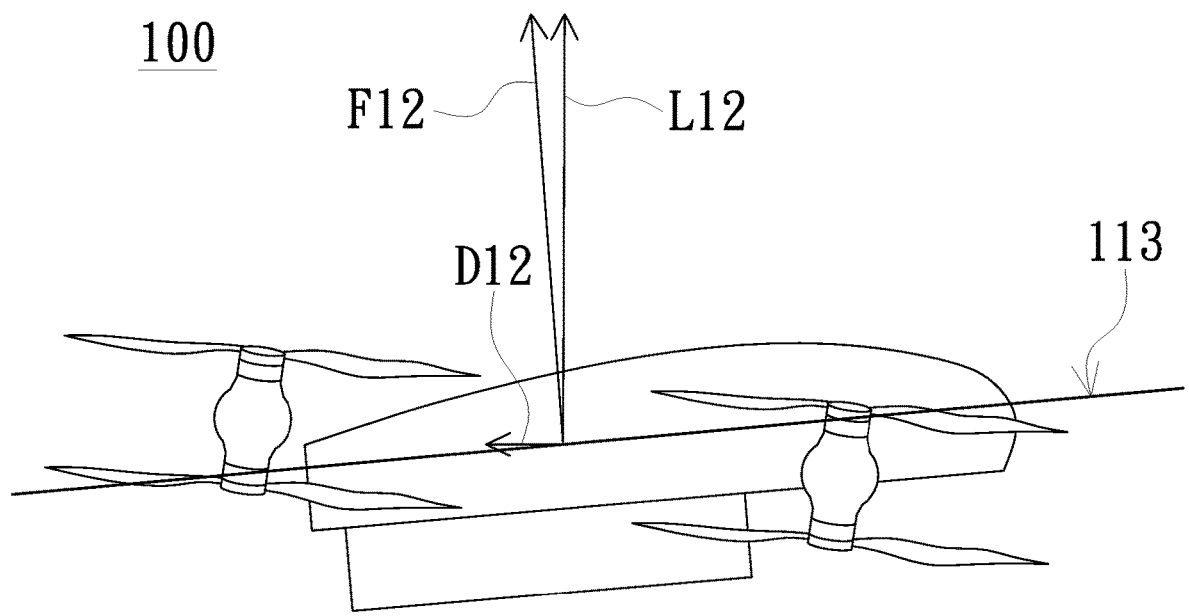
FIG. 1C is a schematic force diagram illustrating the drag force and the lift force of the rotorcraft of FIG. 1A.

FIG. 1C is a schematic force diagram illustrating the drag force and the lift force of the rotorcraft of FIG. 1A. Referring to FIG. 1C, the component force F12 generated by the air stream AF1 may be further divided into a lift force L12 in a vertical direction (same as the gravity line G1) and a drag force D12 in a horizontal direction (parallel to the horizontal plane H1) respectively. The direction of the lift force L12 is upward, that is, opposite to the direction of the gravity line G1 (please refer to FIG. 1A). Therefore, an additional lift force L12 generated by the air stream AF1 can help reduce the load of the rotorcraft 100, so as to reduce the burden of the rotary-wing parts 120. The hovering time may be extended.

Figure 2A:
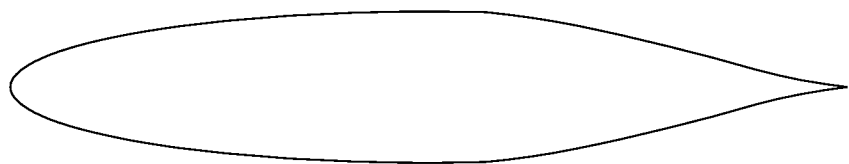
FIG. 2A is a schematic view of an airfoil (No: NACA66-018) disclosed by the National Advisory Committee for Aeronautics (NACA).
Figure 2B:
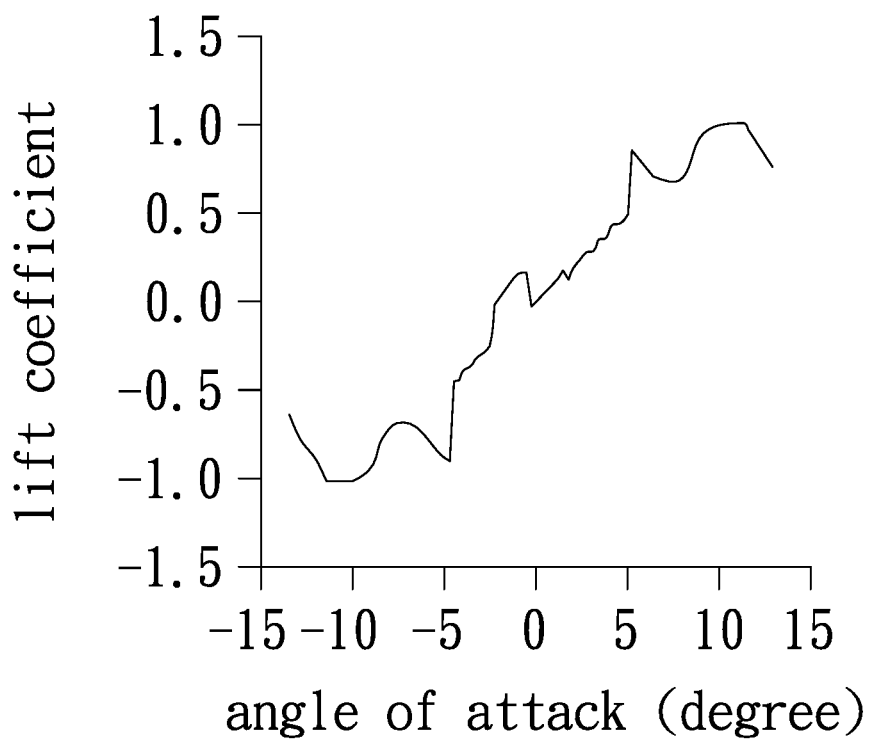
FIG. 2B is a schematic diagram showing the change of the lift coefficient of the airfoil in FIG. 2A as the angle of attack changes.

FIG. 2A is a schematic view of an airfoil (No: NACA66-018) disclosed by the National Advisory Committee for Aeronautics (NACA), and FIG. 2B is a schematic diagram showing the change of the lift coefficient of the airfoil in FIG. 2A as the angle of attack changes.

In the embodiment, the body 110 of the rotorcraft 100 may adopt the same or similar appearance as the airfoil 20. In general, according to fluid mechanics, the lift force in the embodiment substantially satisfies the following equation (1).

$$F=0.5C\rho V^2 A \tag{1}$$

F denotes the lift force and its unit is Newton (N). ρ denotes the air density and its unit is kilograms per cubic meter (kg/m$^3$). V denotes the speed of the air stream AF1 relative to the rotorcraft 100 when the rotorcraft 100 is flying, and its unit is meters per second (m/s). A denotes the frontal area and its unit is square meter (m$^2$). C denotes the lift coefficient which varies with the angle of attack, as shown in FIG. 2B. As shown in FIG. 2B, C is equal to 0.5 when the angle of attack is +5 degrees, and C is equal to 1 when the angle of attack is +10 degrees. Conversely, C is equal to 0.88 when the angle of attack is −5 degrees, and C is equal to −1 when the angle of attack is −10 degrees.

Equation (1) satisfies the values listed in Table (1) below.

TABLE (1)

| Angle of attack AA1 | Lift coefficient C | Air density ρ | Speed V of air stream AF1 | Frontal area A | Lift force F |
|---|---|---|---|---|---|
| +5 degrees | 0.5 | 1.2 kg/m$^3$ | 10 m/s | 0.024 m$^2$ | 0.72 N |
| +10 degrees | 1 | 1.2 kg/m$^3$ | 10 m/s | 0.024 m$^2$ | 1.44 N |
| −5 degrees | −0.88 | 1.2 kg/m$^3$ | 10 m/s | 0.024 m$^2$ | −1.27 N |
| −10 degrees | −1 | 1.2 kg/m$^3$ | 10 m/s | 0.024 m$^2$ | −1.44 N |

It can be seen that when the body 110 of the rotorcraft 100 adopts the same or similar appearance as the airfoil 20, an additional 0.72 N of lift force may be generated with the angle of attack AA1 being +5 degrees, and such a lift force is equivalent to a gram-force of 73 g. An additional 1.27 N of negative lift force may be generated with the angle of attack AA1 being −5 degrees, and such a negative force is equivalent to a gram-force of 130 g. An additional 1.44 N of lift force may be generated with the angle of attack AA1 being +10 degrees, and such a lift force is equivalent to a gram-force of 147 g. An additional 1.44 N of negative lift force may be generated with the angle of attack AA1 being −10 degrees, and such a negative lift is equivalent to a gram-force of 147 g.

Figure 3:
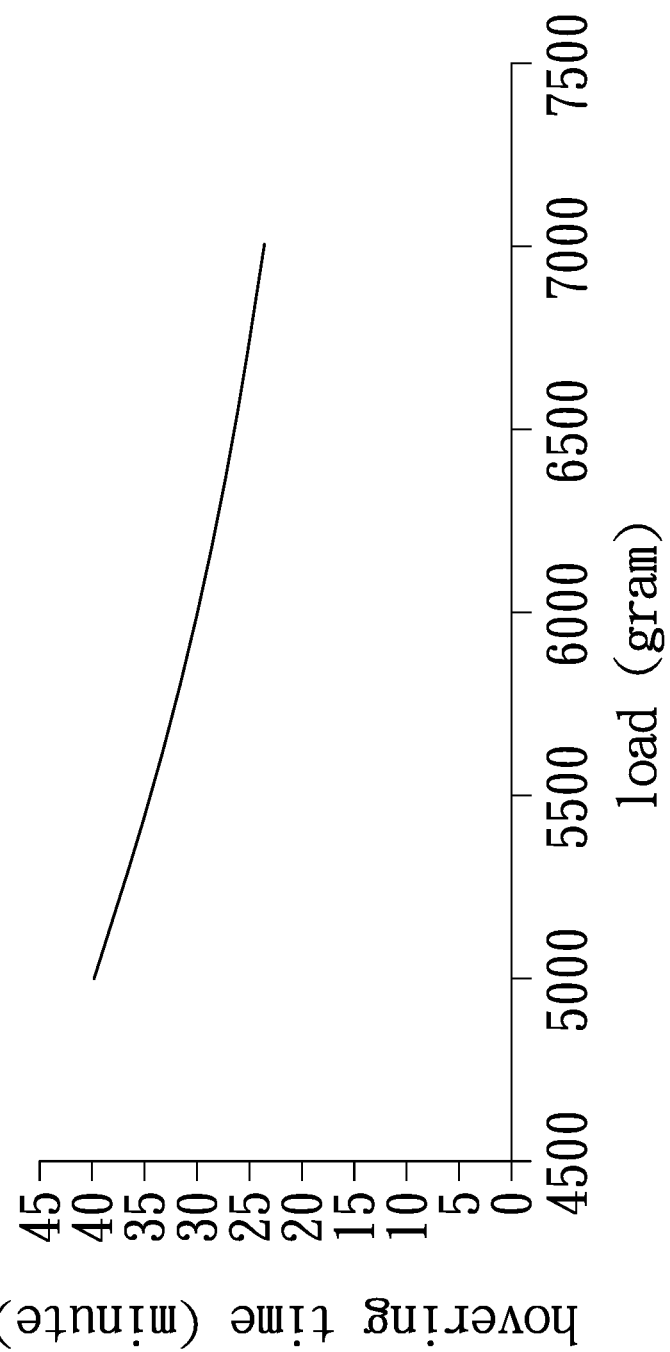
FIG. 3 is a schematic diagram showing the change of the hovering time of the rotorcraft as the load changes according to an embodiment of the invention.

FIG. 3 is a schematic diagram showing the change of the hovering time of the rotorcraft as the load changes according to an embodiment of the invention. The numerical values disclosed in FIG. 3 are measured in accordance with a flight in an embodiment of the invention, and the load indicated by the horizontal axis in FIG. 3 is the weight measured by a drone. The existing drone will generate a negative angle of attack when flying, so the hovering time indicated by the vertical axis in FIG. 3 is not only affected by the load, but also by the negative lift force generated by the negative angle of attack. In other words, the hovering time of the existing drone shown in FIG. 3 is actually the result affected by the negative lift force described-above.

Referring to FIG. 3, when the load of the rotorcraft 100 is 6000 grams, the hovering time may be increased by about 10% as the load is reduced by 5% (substantially equivalent to 300 grams). Under the premise that both the existing drone and the rotorcraft 100 have the same or similar appearance as the airfoil 20, the rotorcraft 100 with a +5 degrees angle of attack AA1 has an additional positive lift force of 203 (73+130) gram-force, compared with the existing drone with a −5 degrees angle of attack, so that the rotorcraft 100 has 6% more hovering time than the existing drone. The rotorcraft 100 with a +10 degrees angle of attack AA1 has an additional positive lift force of 294 (147+147) gram-force, compared with the existing drone with a −10 degrees angle of attack, so that the rotorcraft 100 has 10% more hovering time than the existing drone.

In summary, in the rotorcraft of the invention, the angle between the axis of each of the shafts and the normal line of the reference plane is between 5 and 30 degrees. Therefore, when the rotorcraft is flying forward, a positive angle of attack is formed, so that the air stream can generate an additional lift force to reduce the load of the rotorcraft. Compared with the existing drone with a negative angle of attack, the rotorcraft of the invention has a longer hovering time and can reduce the loss of energy (such as electric power).

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A rotorcraft, comprising a body and a plurality of rotary-wing parts, wherein:

the body has a front-end portion, a rear-end portion, two side portions, and a reference plane passing through the front-end portion, the rear-end portion, and the two side portions, wherein the body has an airfoil appearance; and each of the plurality of rotary-wing parts comprises at least one blade and a shaft coupled to the at least one blade, the shaft of the each of the plurality of rotary-wing parts is inclined toward the front-end portion of the body, and the at least one blade is rotated around an axis of the shaft; and wherein an angle between the axis of the shaft and a normal line of the reference plane is between 5 and 30 degrees, wherein an angle between the normal line of the reference plane and a gravity line is between 5 and 20 degrees, and an angle between the axis of the shaft and the gravity line is between 0 and 10 degrees.

2. The rotorcraft according to claim 1, wherein the plurality of the at least one blade of the plurality of rotary-wing parts are located on a coplanar plane, and the coplanar plane is not parallel to the reference plane.

3. The rotorcraft according to claim 2, wherein the body further has a top surface located between the front-end portion and the rear-end portion, and the plurality of the at least one blade on the coplanar plane are all adjacent to the top surface.

4. The rotorcraft according to claim 2, wherein an angle between the coplanar plane and the reference plane is between 5 and 20 degrees.

5. The rotorcraft according, to claim 1, wherein each of the plurality of rotary-wing parts comprises two blades, the two blades are connected to the same rotary-wing part, and the two blades are respectively connected to two ends of the shaft.

* * * * *